US010891927B1

(12) United States Patent
Finger

(10) Patent No.: US 10,891,927 B1
(45) Date of Patent: Jan. 12, 2021

(54) AUTOMATIC PICKER FOR STRING MUSICAL INSTRUMENTS

(71) Applicant: George Wayne Finger, Cocoa, FL (US)

(72) Inventor: George Wayne Finger, Cocoa, FL (US)

(*) Notice: Subject to any disclaimer, the term of this patent is extended or adjusted under 35 U.S.C. 154(b) by 0 days.

(21) Appl. No.: 16/703,811

(22) Filed: Dec. 4, 2019

(51) Int. Cl.
*G01F 1/20* (2006.01)
*G10F 1/20* (2006.01)
*G10D 3/173* (2020.01)

(52) U.S. Cl.
CPC ............... *G10F 1/20* (2013.01); *G10D 3/173* (2020.02)

(58) Field of Classification Search
CPC .................................. G10F 1/20; G10D 3/173
See application file for complete search history.

(56) References Cited

U.S. PATENT DOCUMENTS 479,672 A 7/1892 Smith
606,220 A 6/1898 Reed
606,222 A 6/1898 Lorenz
606,813 A 7/1898 Reed
628,851 A 7/1899 Reed
668,885 A 2/1901 Schneider
677,584 A * 7/1901 Mitchell ................ G10D 3/173 84/320
683,093 A * 9/1901 Wood et al. .............. G10F 1/20 84/8
692,248 A 2/1902 Davis
769,518 A 9/1904 Verstraelen
921,565 A * 5/1909 Scarlett .................. G10D 3/173 84/320
1,487,164 A * 3/1924 Ista ........................... G10F 1/20 84/8
5,212,330 A * 5/1993 Cooper .................. G10D 3/173 84/320
5,393,925 A * 2/1995 Wilson ...................... G10F 1/20 84/321
8,492,627 B2 7/2013 Dupra
10,803,841 B2 * 10/2020 Campbell .............. G10D 3/173

* cited by examiner

*Primary Examiner* — Robert W Horn

(57) ABSTRACT

A mechanism for picking one or more vibratory strings of a string musical instrument comprising an actuator, shaft, pick and pick holder with extended offset sides to guide the pick to the correct angle for proper picking of a vibratory string on both the forward and backward picking strokes. The shaft is parallel to the vibratory string in one plane and angled to the vibratory string in a perpendicular plane as a means of fine adjustment of the engagement with the vibratory string.

5 Claims, 7 Drawing Sheets

AUTOMATIC PICKER FOR STRING MUSICAL INSTRUMENTS

TECHNICAL FIELD

The present invention relates to automatic picking of string musical instruments and more particularly to an automatic picker for picking of their strings in a natural back and forth manner.

BACKGROUND—PRIOR ART

The following is a tabulation of some prior art that presently appears relevant:

| U.S. patents | | | |
|---|---|---|---|
| Patent Number | Kind Code | Issue Date | Patentee |
| 479672 | B1 | Jul. 26, 1892 | H.G.A. Smith |
| 606220 | B1 | Jun. 28, 1898 | W.S. Reed |
| 606222 | B1 | Jun. 28, 1898 | W.A. Lorenz |
| 606813 | B1 | Jul. 5, 1898 | W.S. Reed |
| 628851A | B1 | Jul. 11, 1899 | W.S. Reed |
| 668885 | B1 | Feb. 26, 1901 | F. Schneider |
| 692248 | B1 | Feb. 4, 1902 | G.H. Davis |
| 769518 | B1 | Sep. 6, 1904 | W.R. Verstraelen |
| 8492627 | B1 | Jul. 23, 2013 | A Dupra |

String automatic musical instruments are picked using a variety of methods:

Elliptical Path Pickers: (U.S. Pat. No. 479,672; 606,220; 606,222; 606,813; 769,518)

Many of these instruments used metal picks moved in an elliptical motion by pneumatics to pick the vibratory strings. Numerous methods were employed to guide the path of the motion. However I have noticed that they picked the vibratory strings from one side and were hard to adjust for the precise action needed to pick the vibratory strings.

Plectrum Wheel Pickers: (U.S. Pat. Nos. 668,885; 8,492,627)

Other picking methods are employed, including a plectrum wheel which used a rotating wheel with projections. A solenoid actuates the plectrum wheel in a ratcheted or stepped motion to pick the vibratory strings in a consistent clockwise (or counterclockwise) motion. These methods also pick the vibratory strings from one side and are difficult to adjust.

Trapezoidal Path Pickers: (U.S. Pat. No. 628,851A)

Similar to the elliptical path pickers, these automatic pickers use a pair of linear cams to move the picker in a trapezoidal path to pick on one stroke and to follow a different path on the unpicked return stroke.

String Shifting Picker: (U.S. Pat. No. 692,248)

Another type of automatic picker depresses the vibratory string to bring the vibratory string into contact with the pick on the forward stroke and releases the vibratory string to allow the picker to return to position on the return stroke. This type of picker also picks from one side of the vibratory string and has the added disadvantage of varying the pick engagement as the vibratory string is moved by different frets up the fret board. This results in unintended volume variations in the music.

All of the existing methods utilize a reciprocating motion with one half of the cycle resulting in a pick of the vibratory string. The other half of the cycle is unused. This effectively reduces the picking frequency of the system by a factor of 2. Further, none of these methods reproduce the natural back and forth picking motion of many live performers who perform on string instruments.

In view of the foregoing drawbacks of prior art, there exists a need for an automatic pick system which picks vibratory strings in a natural back and forth manner and provides for precision control of pick engagement depth, the pick engagement angle and pick stiffness.

SUMMARY OF THE EMBODIMENTS

In accordance with an embodiment, there is provided a string musical instrument. The invention is a means for automatically picking each of the vibratory strings. In one embodiment, the automatic picker for each vibratory string comprises a pick assembly, frame, actuator, connecting hardware, pick holder and pick.

In one embodiment, the instrument body is a banjo body.

Each automatic string picker assembly comprises a servo motor as the actuator. When the servo motor is commanded, it rotates a few degrees clockwise or counterclockwise. The automatic string picker assembly comprises a shaft connected to the servo motor by a coupling. This shaft rotates as driven by the servo motor. The automatic string picker comprises a frame which affixes it to the instrument and guides the shaft extension to be co-planar with the vibratory string and a few degrees skewed to the same vibratory string. The automatic string picker assembly comprises a pick holder which attaches to and moves with the shaft. The pick holder may be located nearer of farther from the instrument bridge and held in place by screws. Since the shaft is co-planar with the string and is at a an angle to the vibratory string, movement of the pick holder axially along the shaft allows precise adjustment of the pick engagement depth. The pick holder has a slot for attaching a pick of any desired stiffness. The pick holder comprises a pick guide which guides the movement of the flexible pick to define the pick engagement angle during vibratory string contact. The automatic string picker assembly utilizes a standard flexible pick, trimmed to fit the pick holder.

When the servo motor rotates, the shaft rotates likewise causing the pick holder to move the pick past the vibratory string. The pick holder rotates the pick past the vibratory string in the following sequence: The pick engages the vibratory string; the vibratory string deflects the pick until the pick deflection is limited by the pick holder to the correct angle; the pick deflects and picks the vibratory string; the pick returns to its undeflected center position in the pick holder. When the servo is rotated in the opposite direction, the same sequence of events occurs. This allows the vibratory string to be picked in a back and forth manner and a good number of picks per second.

In another embodiment, the instrument body is a mandolin body with four pairs of vibratory strings.

Each automatic string picker comprises an electrical solenoid as the actuator. When the solenoid is commanded, it translates a distance in a straight line forward. The automatic string picker comprises a shaft extension connected to the solenoid. This shaft extension translates as moved by the solenoid. The automatic string picker assembly comprises a mounting frame which affixes the assembly to the instrument and guides the shaft extension to be perpendicular to the vibratory string. The automatic string picker comprises a pick holder which attaches to and moves with the shaft extension. The pick holder includes adjustment screws to allow precise adjustment of the pick engagement depth. The pick holder has a slot for attaching a pick of any desired stiffness. The pick holder has pick guides which limit the movement of the flexible pick to define the pick engagement angle during vibratory string contact. The automatic string picker assembly utilizes a standard flexible pick, trimmed fit the pick holder.

When the solenoid translates, the shaft extension translates likewise causing the pick holder to move. The pick moves past the first vibratory string and then the second vibratory string in a single continuous motion. The pick holder translates the pick past the vibratory strings in the following sequence: The pick engages the first vibratory string; the vibratory string deflects the pick until the pick deflection is limited by the pick guide to the correct angle. The pick deflects and picks the vibratory string. The pick returns to its undeflected center position in the pick holder. This is repeated for the second vibratory string. When the solenoid is de-energized, a return spring translates the said solenoid in the opposite direction and the same sequence of events occurs. This allows the vibratory strings to be picked in a back and forth manner and a good number of picks per second.

I have found that the distance that the pick extends below the vibratory string, referred here as pick engagement depth, the angle of the pick as it begins to deflect the vibratory string, referred here as the pick engagement angle and the stiffness of the pick all work together to affect the picking of a string musical instrument.

It is a primary object of this invention to pick vibratory strings in a natural back and forth manner.

It is another object of the present invention to provide for control of pick engagement depth and the pick engagement angle.

It is another object of the present invention to provide an automatic picking system which is adaptable to a wide variety of string instruments including paired string instruments, such as the mandolin or the twelve string guitar.

It is yet another object of the present invention to provide for accommodation of a wide range of commercially available picks and pick stiffness.

Whereas there may be many embodiments of the present invention, each embodiment may meet one or more of the foregoing recited objects in any combination. It is not intended that each embodiment will necessarily meet each objective. Thus, having broadly outlined the certain features in order that the detailed description thereof may be better understood, and that the present contribution to the art may be better appreciated, there are, of course, additional features that will be described herein and will form a part of the subject matter of this specification and claims. Also it is to be understood that the phraseology and terminology employed herein are for the purpose of description and should not be regarded as limiting.

BRIEF DESCRIPTION OF THE DRAWINGS

In order that the manner in which the above recited and other advantages and objects of the invention are obtained, a more particular description of the invention briefly described above will be rendered by reference to specific embodiments there of which are illustrated in the appended drawings. Understanding that these drawings depict typical embodiments of invention and are not therefore to be considered to be limiting of its scope, the invention will be described and explained with additional specificity and detail through the use of the accompanying drawings in which:

FIG. 7A is a front orthogonal view of a pick holder and vibratory string immediately prior to the pick holder beginning a counter clockwise rotation to pick the vibratory string.

FIG. 7B is a front orthogonal view of a pick holder and vibratory string as the pick first engages the vibratory string during a counter clockwise rotation to pick the vibratory string.

FIG. 7C is a front orthogonal view of a pick holder and vibratory string as the pick has been deflected by the vibratory string to the pick deflection limit allowed by the left pick guide during a counter clockwise rotation to pick the vibratory string.

FIG. 7D is a front orthogonal view of a pick holder and vibratory string as both the pick and the vibratory string have been deflected to the point immediately prior to vibratory string release, as allowed by the left pick guide during a counter clockwise rotation to pick the vibratory string.

FIG. 7E is a front orthogonal view of a pick holder and vibratory string immediately after to the pick holder has completed a counter clockwise rotation to pick the vibratory string and immediately prior to beginning a clockwise rotation to pick the vibratory string again.

FIG. 8A is a front orthogonal view of a pick holder and vibratory string immediately prior to the pick holder beginning a clockwise rotation to pick the vibratory string.

FIG. 8B is a front orthogonal view of a pick holder and vibratory string as the pick first engages the vibratory string during a clockwise rotation to pick the vibratory string.

FIG. 8C is a front orthogonal view of a pick holder and vibratory string as the pick has been deflected by the vibratory string to the pick deflection limit allowed by the right pick guide during a clockwise rotation to pick the vibratory string.

FIG. 8D is a front orthogonal view of a pick holder and vibratory string as both the pick and the vibratory string have been deflected to the point immediately prior to vibratory string release, as allowed by the left pick guide during a clockwise rotation to pick the vibratory string.

FIG. 8E is a front orthogonal view of a pick holder and vibratory string immediately after to the pick holder has completed a clockwise rotation to pick the vibratory string and immediately prior to beginning a counter-clockwise rotation to pick the vibratory string again.

The drawings are not to scale. In fact, some aspects have been emphasized for a better illustration and understanding of the written description.

| Parts List | |
|---|---|
| 1 | automatic picker assembly group |
| 2 | pick |
| 3 | pick holder |
| 4 | pick fasten screw |
| 5 | pick holder adjustment screw |
| 6 | shaft |
| 7 | bushing |
| 8 | coupling |
| 9 | coupling shaft screw |
| 10 | reserved |
| 11 | servo motor |
| 12 | reserved |
| 13 | pick assembly frame |
| 14 | pick assembly mount screw |
| 15 | shaft mounting hole |
| 16 | shaft mounting hole |
| 17 | pick holder slot |
| 25 | pick engagement depth |
| 26 | extended pick guide |
| 27 | pick deflection gap limit |
| 28 | shaft skew angle |
| 29 | reserved |
| 30 | pick trim area |
| 31 | outline of commercial pick |
| 32 | pick guide depth |
| 33 | pick engagement angle |
| 50 | banjo body |
| 51 | vibratory string |

DETAILED DESCRIPTION OF SPECIFIC EMBODIMENTS

Figure 1:
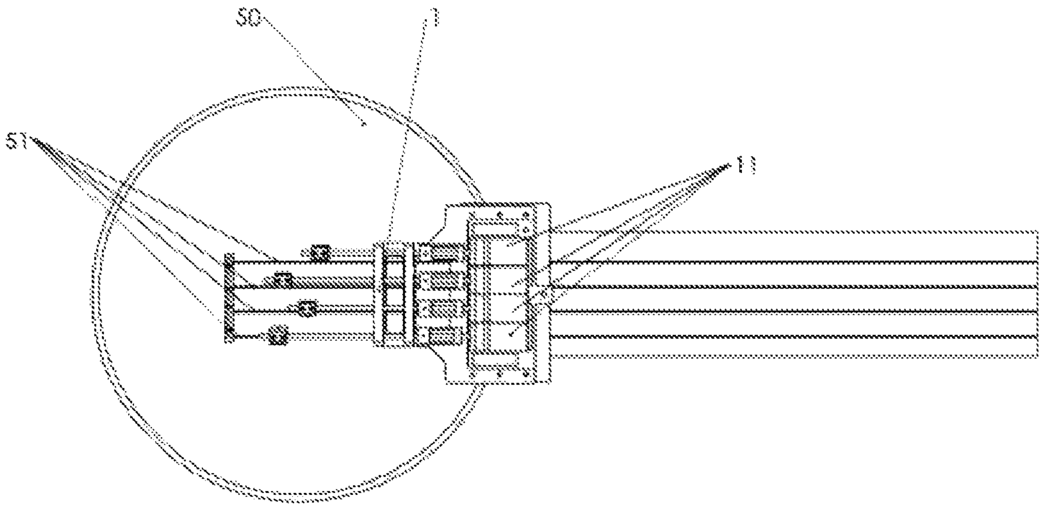
FIG. 1 is a front orthogonal view depicting a group of four automatic string pickers installed on a banjo.

FIG. 1 is a front orthogonal view depicting the automatic picker assembly 1 as installed on a banjo 50. As depicted, a multi-string banjo, comprising four vibratory strings 51 is shown equipped with the present automatic picker assembly Each vibratory string 51 is coupled with an actuating assembly for automatically picking the vibratory string when an electrical signal is provided to the appropriate servo motor 11. Although this disclosure is directed to a four string banjo, the embodiments may be used in any string musical instrument, such as but not limited to, six string guitar, twelve string guitar, mandolin, ukuleles, harp, cello, and the like.

Figure 2:
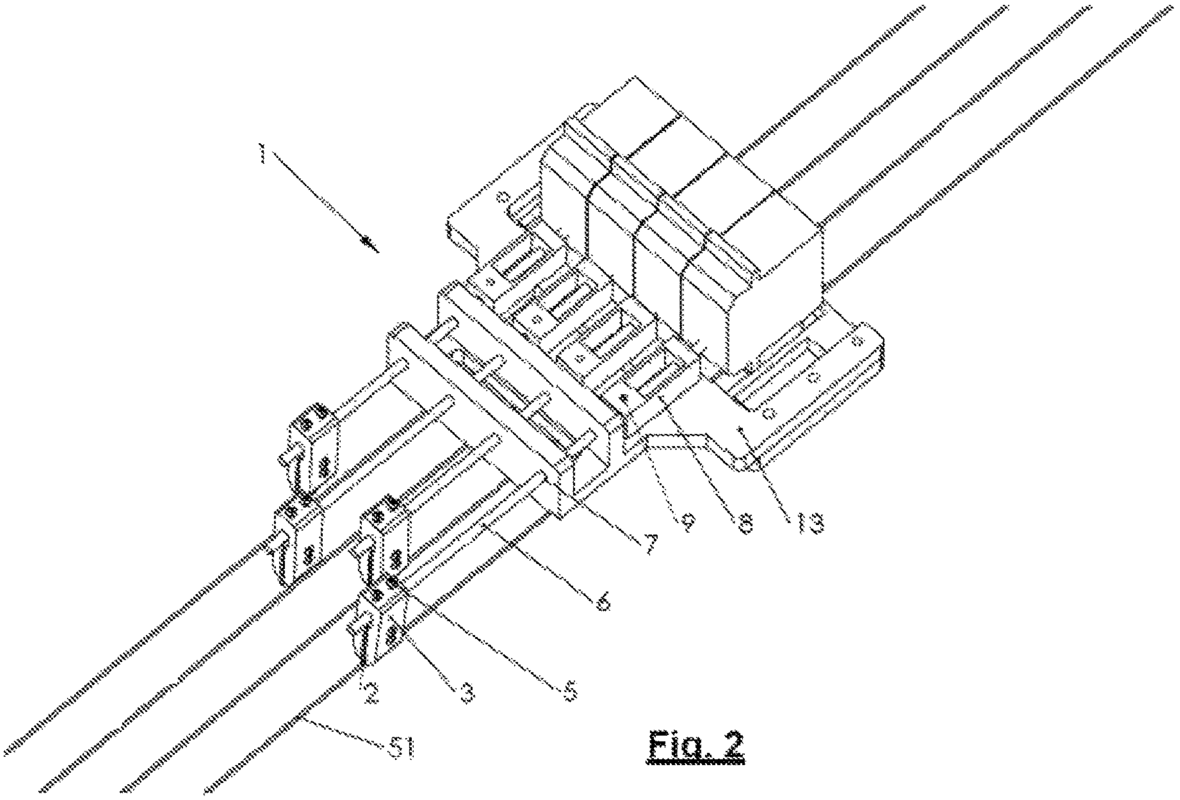
FIG. 2 is a top perspective view of a plurality of picking assemblies of an embodiment, depicting four automatic string pickers each configured to pick a vibratory string.

FIG. 2 is a top perspective view of a group of multiple picking assemblies. As depicted there are four pick holders 3, each holding a pick 2, directly adjacent to a vibratory string 51. Each pick holder 3 a held to its shaft 6 with two pick holder adjustment screws 5. The pick holder adjustment screws 5 fasten the pick holder 3 at the selected position along the shaft 6, thereby providing adjustment of the position along the shaft 6 and the clocking angle of the pick holder 3. The shaft 6 is guided by bushings 7 in the pick assembly frame 13 and fastened to a coupling 8 with a coupling shaft screw 9. The coupling is driven by the output shaft of a servo motor 11. In use, when the servo motor 11 rotates clockwise the commanded number of degrees, the rotary motion is conveyed by the coupling 8 to the shaft 6, to the pick holder 3, to cause the pick 2 to be rotated the same number of degrees, thereby picking the vibratory string 51. When the servo motor 11 is commanded to rotate counter-clockwise a commanded number of degrees, the rotary motion similarly causes the pick 2 to be rotated thereby picking the vibratory string 51 on the reverse path.

Figure 3:
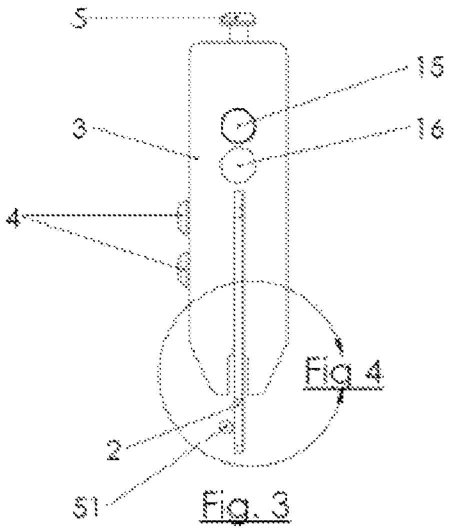
FIG. 3 is a front orthogonal view of a pick holder, its associated hardware and a vibratory string.

FIG. 3 is a front orthogonal view of a pick holder 3, pick holder adjustment screw 5, pick 2, pick fasten screws 4, two shaft mounting holes 15 and 16. The pick holder 3 is fastened to the shaft 6 by placing the shaft 6 through either shaft mounting hole 15 or shaft mounting hole 16. This provides a gross adjustment of height of the pick holder 3 above the vibratory string 51. The pick 2 is fastened to the pick holder 3 by placing the pick 2 into the pick holder slot 17, leaving the desired amount of pick 2 extending beyond the pick holder 3 and then tightening the pick fasten screws 4.

Figure 4:
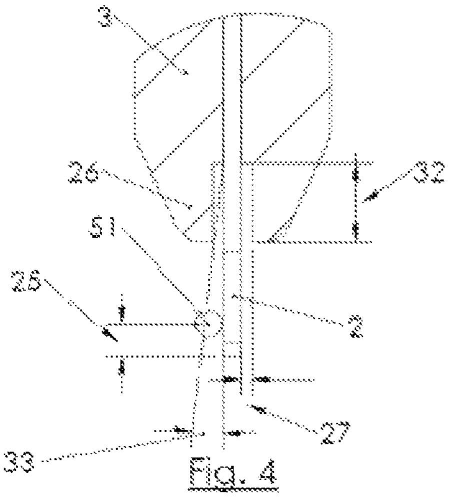
FIG. 4 is a front orthogonal detail of a pick holder, pick, vibratory string, pick engagement depth, pick guides, pick guide depth and pick deflection limit.

FIG. 4 is a front orthogonal detail of a pick holder 3 and defining aspects of control of the embodiment namely, pick engagement depth 25, pick guide 26 and pick deflection gap 27. The pick engagement depth 25 is the extension of the pick 2 beyond the vibratory string 51. The pick guide 26 is that portion of the pick holder 3 which limits the amount of travel that the pick 2 may bend before it is supported by the pick holder 3. The pick deflection gap 27 is the amount of gap between a surface of the pick 2 and the adjacent side of the pick guide zone 26. Together the length of the pick guide gap 26 and the pick deflection allowance 27 create a supplemental stiffener for the pick 2 which allows single pick 2 to correctly play a vibratory string 51 at the controlled and correct picking angle 33 from either side.

Figure 5:
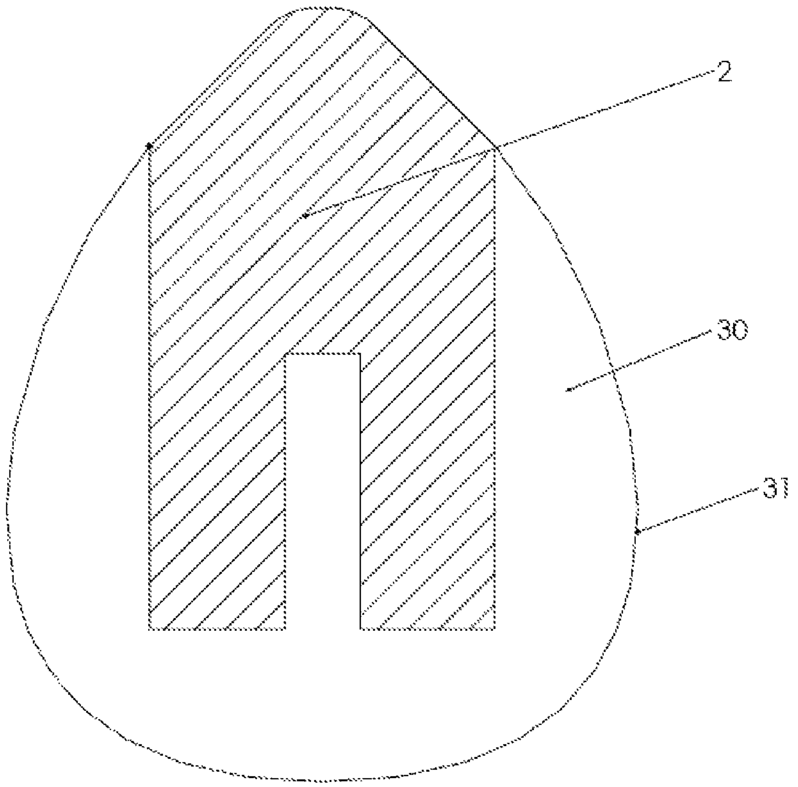
FIG. 5 is a side orthogonal view of a typical pick and the modifications for use with the pick holder.

FIG. 5 is a side orthogonal detail of a pick 2 showing how a commercial pick is modified to be used in the present embodiment. The pick trim area 30 is cut away from a commercially available pick to provide a pick 2 which can be fastened to the pick holder 3. The trimming of the commercial pick sides allow multiple pick holders 3 to be more closely spaced without interference. The trimming of the commercial pick also creates in the pick 2 a center slot for gross adjustment of pick engagement depth.

Figure 6:
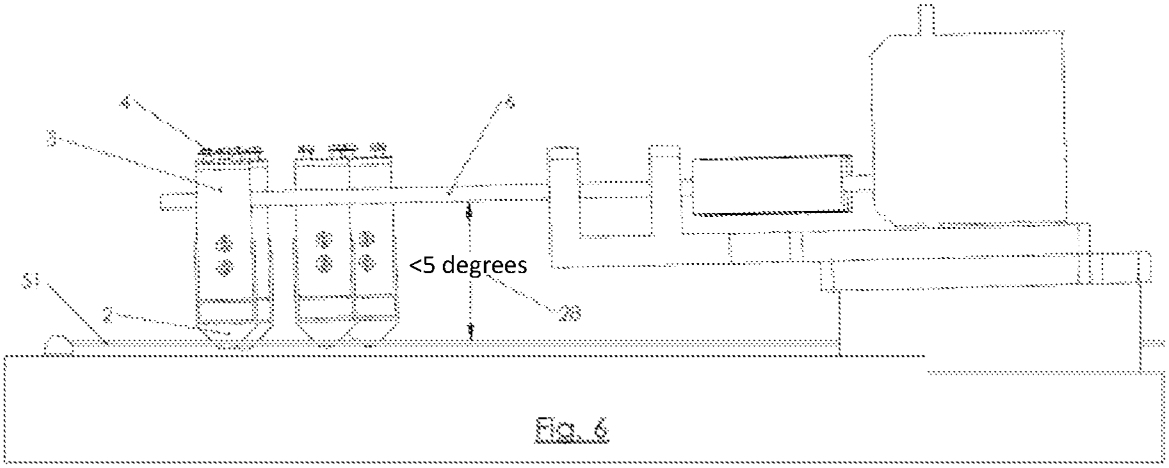
FIG. 6 is a side orthogonal detail depicting the shaft and vibratory string at a slight angle which enables the capability to vary the vibratory string engagement by adjusting the pick holder position on the shaft.

FIG. 6 is a side orthogonal detail of a pick 2, pick holder 3, shaft 6 and vibratory string 51 illustrating additional aspects of the present embodiment namely, shaft skew angle 28. The line of the shaft 6 and the line of the vibratory string 51 reside in the same plane throughout the rotation of the pick, but are not parallel. They are skewed by a few degrees—the shaft skew angle 28. The allows fine adjustment of the pick engagement depth by loosening the pick holder adjustment screws 4, sliding the pick holder 3 one way or the other on the shaft 6 a short distance and then tightening the pick holder adjustment screws 4. Multiple positions of the pick holder 3 are illustrated along the shaft 6. Note the difference in pick engagement depth in the different positions.

FIGS. 7A through 7E are a front orthogonal detail of a pick 2, pick holder 3, shaft 6 and vibratory string 51 illustrating a counter-clockwise picking sequence.

Figures 7A, 7B, 7C, 7D, 7E:
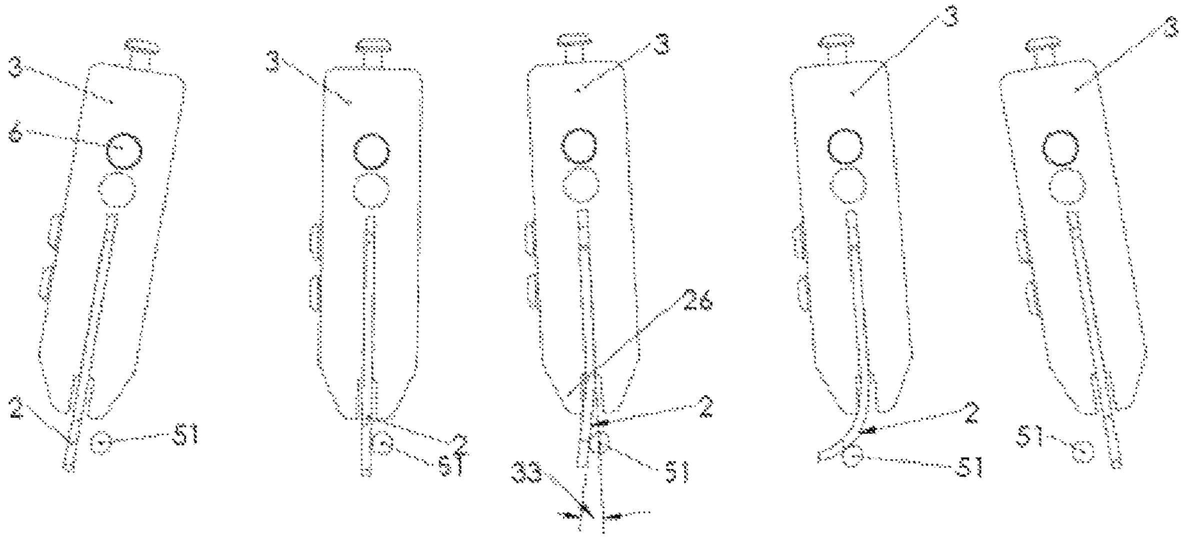
FIGS. 7A through 7E are a time sequence of five views showing front orthogonal view of the pick holder as it picks a vibratory string in the counterclockwise direction.

FIG. 7A illustrates the pick holder 3 in a position at rest prior to a counter-clockwise rotation for picking a vibratory string 51.

FIG. 7B illustrates the pick holder 3 in its counterclockwise rotation at the point where it has just begun to contact the vibratory string 51. The pick 2 has not yet begun its deflection.

FIG. 7C illustrates the pick holder 3 in its counterclockwise rotation at the point where it has contacted the vibratory string 51 and the pick 2 has deflected to the point that the pick 2 has contacted the left pick guide 26 and has utilized the entire pick deflection gap and is now at the optimum pick engagement angle 33 to play the vibratory string 51.

FIG. 7D illustrates the pick holder 3 in its counterclockwise rotation at the point where it has contacted the vibratory string 51 and the pick 2 has deflected to the point that the pick 2 has utilized the entire pick deflection allowance and has also deflected both the pick 2 and the vibratory string 51 to the point of vibratory string release, thereby playing the vibratory string.

FIG. 7E illustrates the pick holder 3 in a position at rest after picking a vibratory string 51.

Note that FIG. 7E also illustrates the pick holder 3 in a position at rest prior to a clockwise rotation for picking a vibratory string 51.

FIGS. 8A through 8E are a front orthogonal detail of a pick 2, pick holder 3, shaft 6 and vibratory string 51 illustrating a clockwise picking sequence. The clockwise rotation follows a similar sequence to that described above.

Figure 8E:
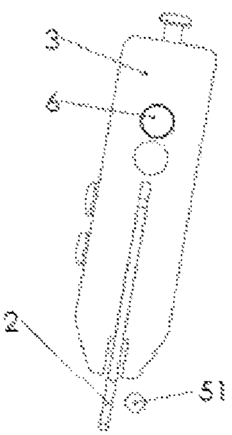
FIGS. 8A through 8E are a time sequence of five views showing a front orthogonal view of the pick holder as it picks a vibratory string in the clockwise direction.
Figure 8D:
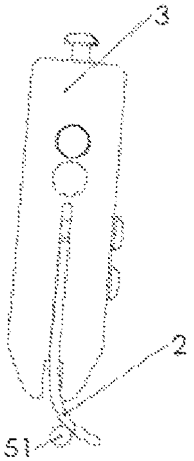
Figure 8C:
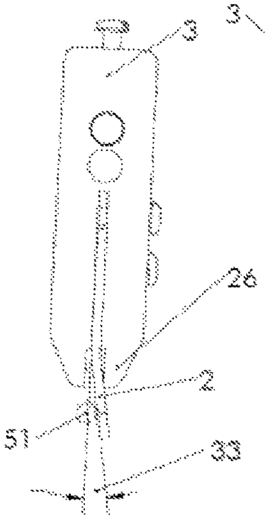
Figure 8B:
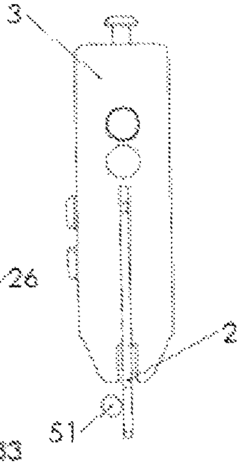
Figure 8A:
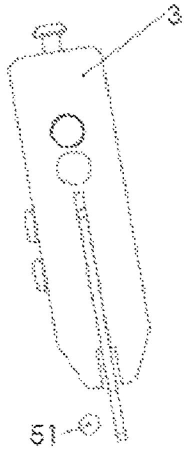

FIG. 8A illustrates the pick holder 3 in a position at rest prior to a counter-clockwise rotation for picking a vibratory string 51.

FIG. 8B illustrates the pick holder 3 in its counterclockwise rotation at the point where it has just begun to contact the vibratory string 51. The pick 2 has not yet begun its deflection.

FIG. 8C illustrates the pick holder 3 in its clockwise rotation at the point where it has contacted the vibratory string 51 and the pick 2 has contacted the right pick guide 26 and has utilized the entire pick deflection gap and is now at the optimum pick engagement angle 33 to play the vibratory string 51.

FIG. 8D illustrates the pick holder 3 in its counterclockwise rotation at the point where it has contacted the vibratory string 51 and the pick 2 has deflected to the point that the pick 2 has utilized the entire pick deflection allowance 27 and has also deflected both the pick 2 and the vibratory string 51 to the point of vibratory string release, thereby playing the vibratory string.

FIG. 8E illustrates the pick holder 3 in a position at rest after picking a vibratory string 51.

Note that FIG. 7E also illustrates the pick holder 3 in a position at rest prior to a clockwise rotation for picking a vibratory string 51.

In another embodiment, the movement is translational instead of rotational. Although FIGS. 7 A though 7E and FIGS. 8A trough 8E describe a rotational sequence, a similar sequence of the comprised automatic string picker is attained by translational movement.

What is claimed is:

1. An automatic picker for string instruments comprising a reciprocating pick holder with a slot where the pick grip is secured within the slot while the picking point protrudes, and the holder with pick deflection guides comprising a gap at the end of the slot near the picking point, the gap faces are guide surfaces to control the pick deflection limit.

2. The automatic picker of claim 1, where the pick holder is mounted on a shaft distal from the picking point and is rotated by a prime mover, comprising one of an electric motor or a pneumatic actuator.

3. The automatic picker of claim 2, rotated through an arc of less than 15 percent by the prime mover, where the prime mover is a servo motor.

4. An automatic picker for string instruments comprising a reciprocating pick holder mounted to a rotating shaft which is coplanar-to the string comprising a shaft skew angle to the string, allowing fine adjustment of the pick engagement with the string by moving-the pick holder along the shaft.

5. The automatic picker of claim 2, and comprising a pick has non-vertical engagement angle with a string on both the forward and backward stroke and the pick deflects according to the deflection limit to pluck the string.

* * * * *